Patented Mar. 18, 1952

2,589,519

UNITED STATES PATENT OFFICE 2,589,519

FLUORESCENT AGENTS

Paul E. Hoch and William H. Libby, Easton, Pa., assignors to General Aniline & Film Corporation, New York, N. Y., a corporation of Delaware No Drawing. Application January 15, 1951, Serial No. 206,126

7 Claims. (Cl. 260—507)

This invention relates to novel fluorescent compounds of the diamidostilbenedisulfonic acid series.

It has been found that novel fluorescent compounds of the diamidostilbenedisulfonic acid series which are characterized by the following general formula are particularly valuable for the whitening or brightening of textiles by incorporating a minor amount thereof in soaps or detergents used for washing textiles. These novel compounds have the formula

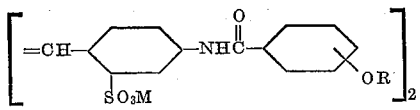

where R is a haloalkyl or haloalkenyl group selected from the group consisting of —CH₂CH₂X, —CH₂CH₂CH₂X,

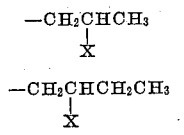

and

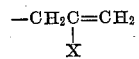

wherein X is Cl or Br; and M represents a member of the group consisting of H and a cation usually alkali metal or alkaline earth metal.

These compounds are readily prepared by condensing one molecular proportion of 4,4'-diamino-2,2'-stilbenedisulfonic acid with a slight excess of about two molecular proportions of a haloalkoxy or haloalkenoxy benzoyl halide.

The preparation of the novel compounds of the present invention is fully described in the following specific examples.

Example 1

To 9.25 parts of 4,4'-diamino-2,2'-stilbenedisulfonic acid dissolved in 30 parts of water and 38 parts of a 20 percent aqueous sodium carbonate solution there is added 51 parts of acetone and the resulting mixture cooled to 0–5° C. A solution of 16.4 parts of 2-(β-chloroethoxy)-benzoyl chloride in 20 parts of acetone is added dropwise. The temperature is held at 0–5° C. during the addition and the reaction mixture is maintained alkaline to Brilliant Yellow throughout by the addition of small portions of a sodium carbonate solution. When the reaction is complete, the mixture is allowed to warm to room temperature and the product isolated in the usual manner.

The product corresponds to the formula:

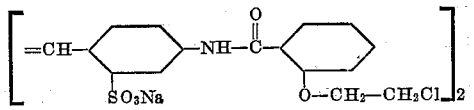

When this material is incorporated into discharge pastes and applied to fabrics, the whites thus obtained are remarkably whiter than those obtained using ordinary discharge pastes. When this material is applied to fibers of cellulose, wool or nylon, by methods well known in the art, the white appearance of the fabric is thereby much improved.

If small amounts of this substance are added to soaps or detergents and the resulting mixtures are used to wash fabrics of cellulose, wool or nylon, the white materials thus washed are significantly whiter in appearance and colored materials are brighter than similar materials which are washed using ordinary soaps or detergents.

The 2-(β-chloroethoxy)-benzoyl chloride used in the senses described in the first paragraph of this example was prepared in the manner described in copending application of Hoch et al., Serial No. 209,918, filed January 7, 1951 by the reaction of ethylene oxide on methyl salicylate and the reaction product then converted to the acid chloride with thionyl chloride. During this last reaction the hydroxyl group of 2-(β-hydroxyethoxy)-benzoic acid is also replaced by chlorine.

Example 2

The procedure described in the first paragraph of Example 1 was repeated, using in place of the 2-(β-chloroethoxy)-benzoyl chloride, 16.4 parts of 3-(β-chloroethoxy) benzoyl chloride. The product obtained had the following formula:

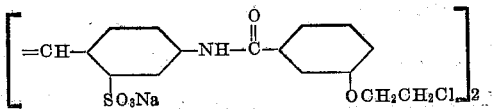

and was substantially similar in properties to the product of Example 1.

The 3-(β-chloroethoxy)-benzoyl chloride employed in this example was obtained in the manner similar to that described in the last paragraph of Example 1 using 3-hydroxy methylbenzoate in place of methyl salicylate.

*Example 3*

The procedure of paragraph 1 of Example 1 was repeated, using 16.4 parts of 4-(β-chloroethoxy)-benzoyl chloride in place of the 2-(β-chloroethoxy)-benzoyl chloride. A product having the following formula was obtained:

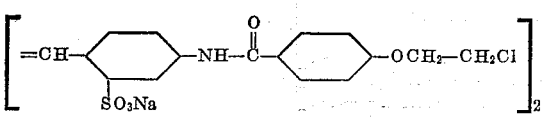

This product was also substantially similar in properties to the product of Example 1.

The 4-(β-chloroethoxy)-benzoyl chloride employed in this example was obtained by a procedure similar to that outlined in the last paragraph of Example 1 using 4-hydroxy methyl benzoate in place of methyl salicylate.

*Example 4*

The synthesis of paragraph 1 of Example 1 was repeated using 17.4 parts of 2-(γ-chloropropoxy)-benzoyl chloride. A product similar in properties to that of Example 1 and of the following formula was obtained:

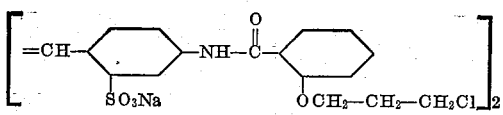

The 2-(γ-chloropropoxy)-benzoyl chloride used in this example was prepared in a manner similar to that outlined in the last paragraph of Example 1 using trimethylene oxide in place of ethylene oxide.

*Example 5*

The synthesis of paragraph 1 of Example 1 was repeated using 17.4 parts of 2-(β-chlorobutoxy)-benzoyl chloride in place of 2-(β-chloroethoxy)-benzoyl chloride. A product similar in properties to that of Example 1 and having the following formula was obtained:

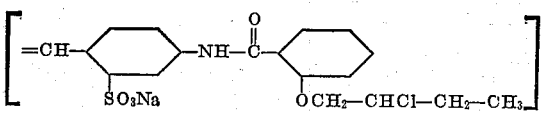

The 2-(β-chlorobutoxy)-benzoyl chloride employed in this example was prepared in a manner similar to that outlined in the last paragraph of Example 1 using butylene oxide-1,2 instead of ethylene oxide.

*Example 6*

The synthesis of paragraph 1 of Example 1 was repeated using in place of the 2-(β-chloroethoxy)-benzoyl chloride 17.4 parts of 2-(β-chloropropene-2-oxy)-benzoyl chloride. A product having properties similar to that of Example 1 and of the following formula was obtained:

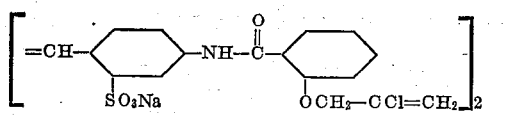

The 2-(β-chloropropene-2-oxy)-benzoyl chloride used in this example was prepared by reacting chloro allyl chloride (2,3-dichloropropene) with methyl salicylate in the presence of an acid acceptor. The resulting ester was converted to the acid chloride by hydrolysis and the action of thionyl chloride.

It will be apparent that, if desired, the free acids corresponding to the sodium salts obtained in the specific examples may readily be produced by acidifying the sodium salt with a strong mineral acid. These products are normally employed in the form of their sodium salt. However, for special applications other salts may be desired.

The potassium salt may readily be obtained by neutralization of the free acid with potassium hydroxide or may be obtained directly by using potassium carbonate in place of sodium carbonate in the above examples.

A salt such as barium or strontium salts, which have been found to be of interest for the whitening of photographic prints, may be obtained by neutralization of free acids. Where spirit solubility is desired, the various amine salts, such as cyclohexylamine salts, may be desired and may be obtained by neutralization of the free acids.

We claim:

1. Fluorescent agents of the formula

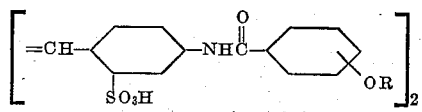

wherein R represents a member of the group consisting of haloalkyl and haloalkenyl radicals of the formula $$-CH_2-CH_2X, \quad -CH_2CH_2\;CH_2X, \quad -CH_2CHCH_3$$
$$\phantom{-CH_2-CH_2X, \quad -CH_2CH_2\;CH_2X, \quad -CH_2CH}\overset{|}{X}$$

$$-CH_2-\underset{X}{\overset{|}{C}HCH_2CH_3}, \text{ and } -CH_2-\underset{X}{\overset{|}{C}}=CH_2$$

wherein X is selected from the group consisting of chlorine and bromine; and salts thereof.

2. Fluorescent agents of the formula

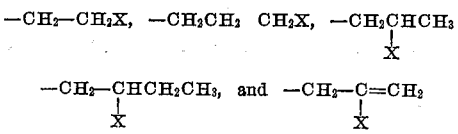

and salts thereof.

3. Fluorescent agents of the formula

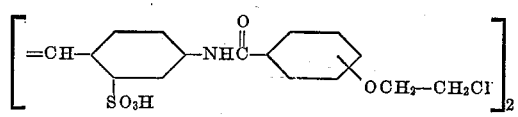

and salts thereof.

4. Fluorescent agents of the formula

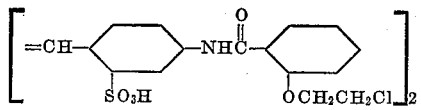

and salts thereof.

5. Fluorescent agents of the formula

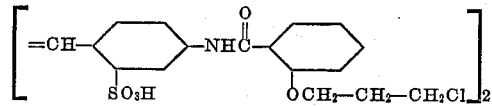

and salts thereof.

6. Fluorescent agents of the formula
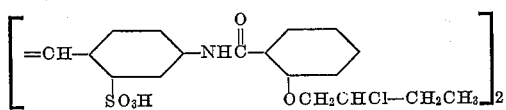
and salts thereof.
7. Fluorescent agents of the formula
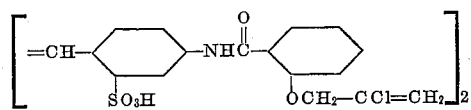
and salts thereof.
PAUL E. HOCH.
WILLIAM H. LIBBY.
REFERENCES CITED
The following references are of record in the file of this patent:
UNITED STATES PATENTS
| Number | Name | Date |
|---|---|---|
| 2,468,431 | Eberhart et al. | Apr. 26, 1949 |